US006467788B1

(12) United States Patent
Li et al.

(10) Patent No.: US 6,467,788 B1
(45) Date of Patent: Oct. 22, 2002

(54) TILT-IN-PLACE WHEELCHAIR HAVING ADJUSTABLE WHEELBASE WIDTH

(76) Inventors: Tianfu Li, 1103 Winthrop Dr., Troy, MI (US) 48083; Yaping Li, Building 4 Room 2-11# Xi Bian Man Wai Da Jie Xi Li, Beijing (CN), 100045

( * ) Notice: Subject to any disclaimer, the term of this patent is extended or adjusted under 35 U.S.C. 154(b) by 0 days.

(21) Appl. No.: 09/873,088

(22) Filed: Jun. 4, 2001

(51) Int. Cl.[7] ................................................ B62B 7/06
(52) U.S. Cl. .................... 280/304.1; 280/649; 280/5.32
(58) Field of Search ........................... 280/250.1, 304.1, 280/42, 293, 5.32, 43.16, 647, 649, 650; 297/42, 45

(56) References Cited

U.S. PATENT DOCUMENTS 3,580,591 A * 5/1971 Coffey ........................ 280/5.32
4,712,830 A * 12/1987 Charbrol et al. .............. 297/42
4,934,722 A * 6/1990 Goetzelman ............. 280/250.1
4,989,890 A 2/1991 Lockard et al.
5,301,970 A * 4/1994 Haskins ................... 280/250.1
5,782,483 A * 7/1998 Rogers et al. .............. 280/642
6,041,876 A * 3/2000 Pulver et al. .............. 180/65.1
6,070,898 A * 6/2000 Dickie et al. ............ 280/304.1
6,164,674 A * 12/2000 Rogers et al. ........... 280/250.1

FOREIGN PATENT DOCUMENTS

EP 0 445 171 B1 11/1997
WO WO 99/37265 7/1999

* cited by examiner

*Primary Examiner*—Avraham Lerner

(57) ABSTRACT

A tilt-in-place wheelchair having adjustable wheelbase includes front and rear side frames, hinged cross members supported on the frames, an adjustment rail supported on the frames for rotation relative to the frames, a block slideably supported on the rail and hinged to one pair of cross members, a latch supported on the rail and adapted for releasable engagement with the rail so that the block is alternately fixed to the rail to maintain the width of the wheelbase or released from the rail to allow adjustment of the wheelbase.

19 Claims, 11 Drawing Sheets

TILT-IN-PLACE WHEELCHAIR HAVING ADJUSTABLE WHEELBASE WIDTH

BACKGROUND OF THE INVENTION

1. Field of the Invention

This invention relates to the field of wheelchairs and other wheeled apparatus for transporting people.

2. Description of the Prior Art

Wheelchairs having a fixed wheelbase width require large main wheels to provide needed stability against overturning. However, the width of such chairs and their wheel size present difficulties in maneuvering the chair in confined spaces such as in washrooms, aircraft, and offices, through doorways, and along narrow aisles.

U.S. Pat. No. 6,164,674 describes a wheelbase adjustable wheelchair. A linkage between two side frames includes two cross members. One end of each being pivotally supported to a side frame on each side of the chair. The cross members are attached mutually at a point of intersection, the other end of each cross member sliding on the opposite side frame.

PCT International Patent Application WO 99/37265 describes a wheelchair having lower and upper side frames, the upper frame being tiltable with respect to the lower frame, ground wheels mounted on the lower frames, and seating and backrest support carried on the upper frames. The upper frame, and the seating and backrest supports are foldable laterally inward regardless of the tilted position of the upper frame.

U.S. Pat. No. 4,603,890 discloses a wheelchair having forward and rearward side frames that are telescopically interconnected so that the length of the frame can be adjusted. A cross brace connecting the side frames permits folding the chair laterally A cross brace mechanism adjusts the width of the chair without adjusting its height.

SUMMARY OF THE INVENTION

It is an object of the present invention to provide a wheelchair, the width of whose wheelbase is adjustable. This feature permits the user to readily narrow the chair's width when narrow doorways and passageways are confronted.

It is another object of the invention to provide a wheelchair having a set of anti-tilting wheels that apply a stabilizing, restoring force to the chair when it is tilted backward. This feature permits safe, reliable backward tilting of the chair by the occupant to avoid or pass-over obstructions at the front caster wheels.

A tilt-in-place wheelchair having adjustable wheelbase includes front and rear side frames, hinged cross members supported on the frames, an adjustment rail supported on the frames for rotation relative to the frames, a block slideably supported on the rail and hinged to one pair of cross members, a latch supported on the rail and adapted for releasable engagement with the rail so that the block is alternately fixed to the rail to maintain the width of the wheelbase or released from the rail to allow adjustment of the wheelbase.

In realizing these objects and advantages a tilt-in-place wheelchair according to the present invention includes a first side frame; a first side frame; a second side frame substantially parallel to the first side frame and spaced laterally therefrom; a first pair of cross members, mutually pivotally interconnected at an inner end thereof and foldable about the pivotal interconnection, a first member of the first pair coupled to and pivotably supported on the first side frame for variable angular positions, a second member of the first pair being coupled to and pivotably supported on the second side frame for variable angular position; a second pair of cross members spaced longitudinally from said first pair of cross members, mutually pivotally interconnected at an inner end thereof and foldable about the pivotal interconnection, a first member of the second pair coupled to and pivotally supported on the first side frame for variable angular position, a second member of the second pair pivotally being coupled to the second side frame for variable angular position; means for adjusting and releasably holding the first pair of cross members and second pair of cross members at predetermined angular positions relative to the first and second side frames; a first tilt wheel extending outward from, and pivotably supported on the first side frame, continually biased resiliently downward toward ground contact and opposing displacement upward away from ground contact; and a second tilt wheel extending outward from, and pivotably supported on the second side frame, continually biased resiliently downward toward ground contact and opposing displacement upward away from ground contact.

DESCRIPTION OF THE PREFERRED EMBODIMENT

Figure 1:
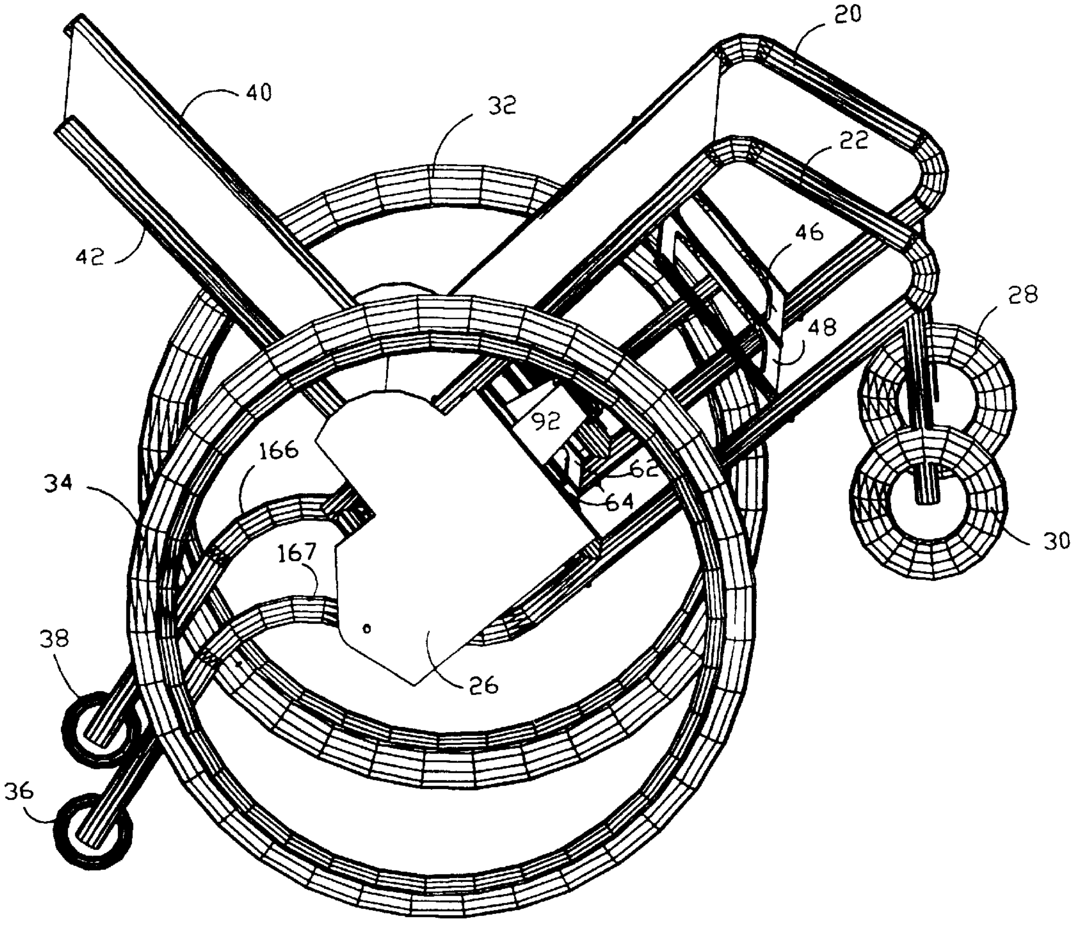
FIG. 1 is an isometric side view of a wheelchair according to this invention tilted backward and positioned to mount an obstruction.

Referring first to FIG. 1, first and second parallel side frames 20, 22 are shown substantially mutually aligned axially and extending axially forward from mounting plates 24, 26 located at the rear of the side frames. Each side frame 20, 22 rotatably supports a front caster wheel 28, 30. Mounting plate 26 rotatably supports primary wheel 34 and pivotally supports a tilt wheel 36. Similarly, plate 24 rotatably supports a first primary wheel 32 and pivotally supports a first tilt wheel 38.

Vertically directed struts 40, 42, adapted to support the back of the chair, extend vertically upward from the upper rails of the first and second side rails 20, 22.

FIG. 1 shows the wheelchair tipped rearward so that the front caster wheels are located above a curb or similar obstruction, and the tilt wheels are contacting, or nearly contacting, the ground to prevent the wheelchair from tipping rearward. In this position, the wheelchair disposed so that the first and second primary wheels can roll over the obstruction.

Figure 2:
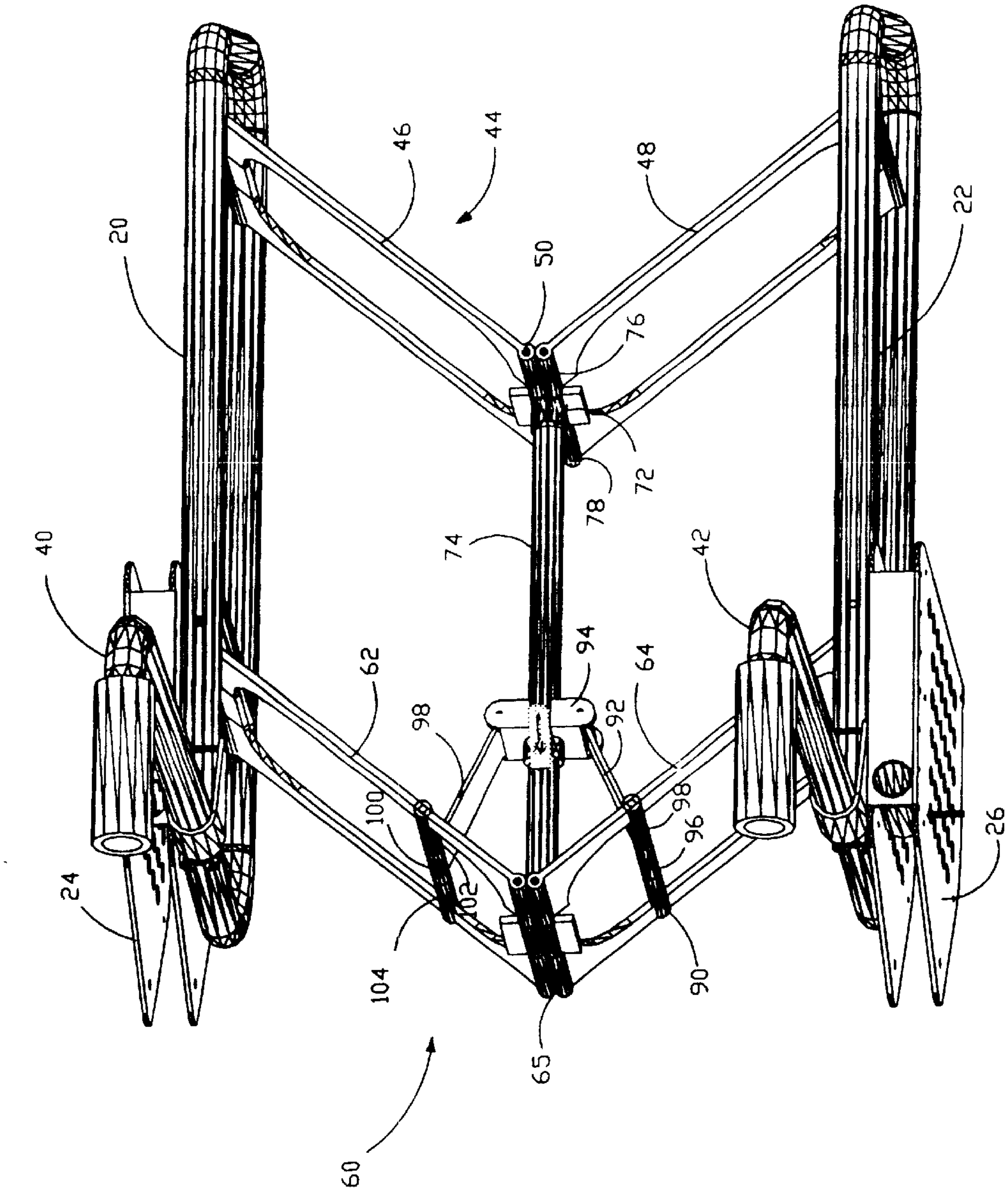
FIG. 2 is a top view showing the side rails, cross members and width-adjustment mechanism of the wheelchair of FIG. 1.
Figure 3:
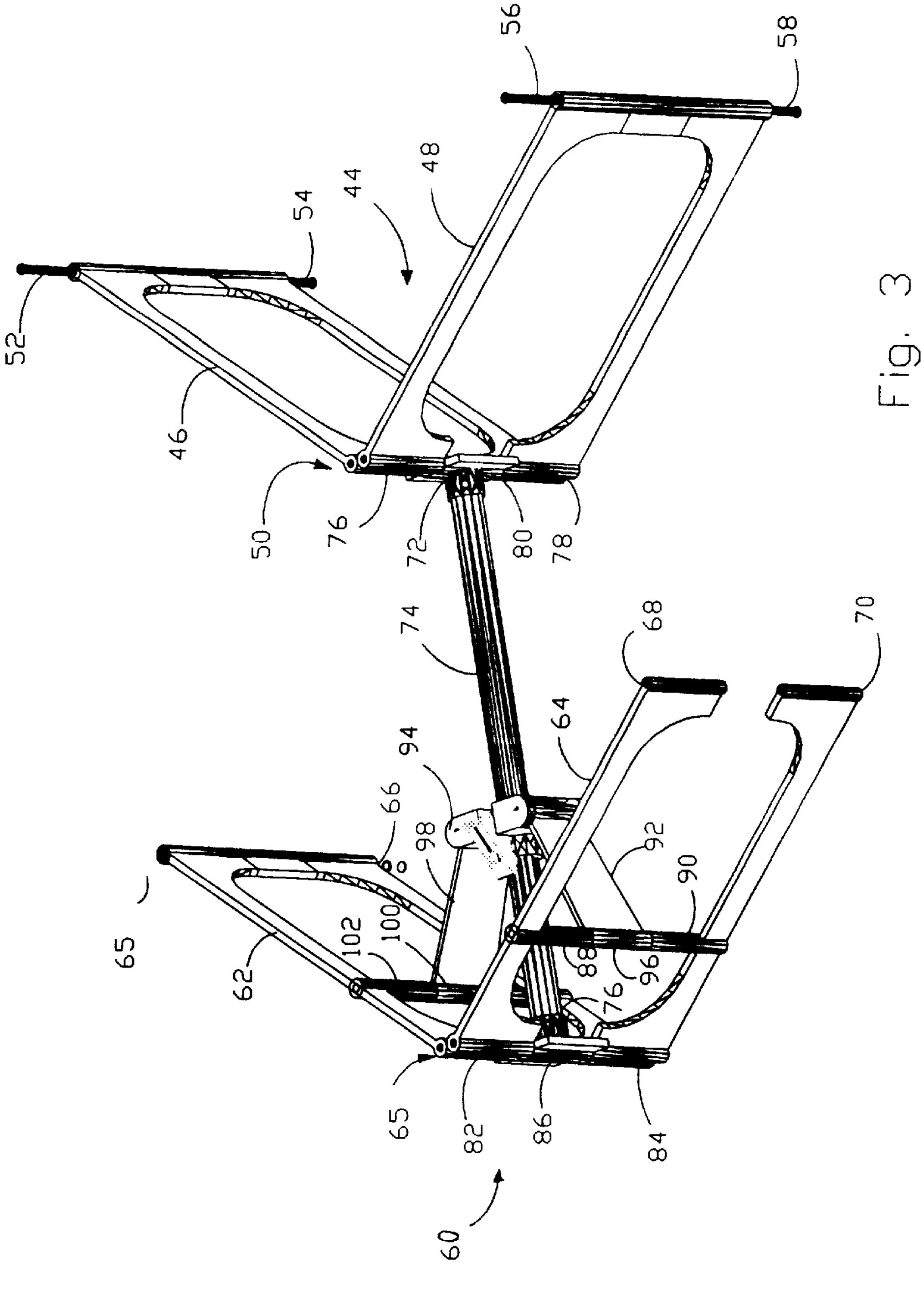
FIG. 3 is an isometric side view showing the cross members and width-adjustment mechanism.

Referring now to FIGS. 2 and 3, a first pair 44 of a cross members or frames 46, 48, pivotably supported at the forward end of the side frames, are mutually connected end-to-end near the center of the space between the side rails for pivoting movement. Cross member 46 is pivotally connected at 52 and 54 to the upper and lower longitudinal rails of side frame 20. Similarly, cross member 48 is pivotally connected at 56, 58 to the upper and lower longitudinal rails of side frame 22.

Figure 4:
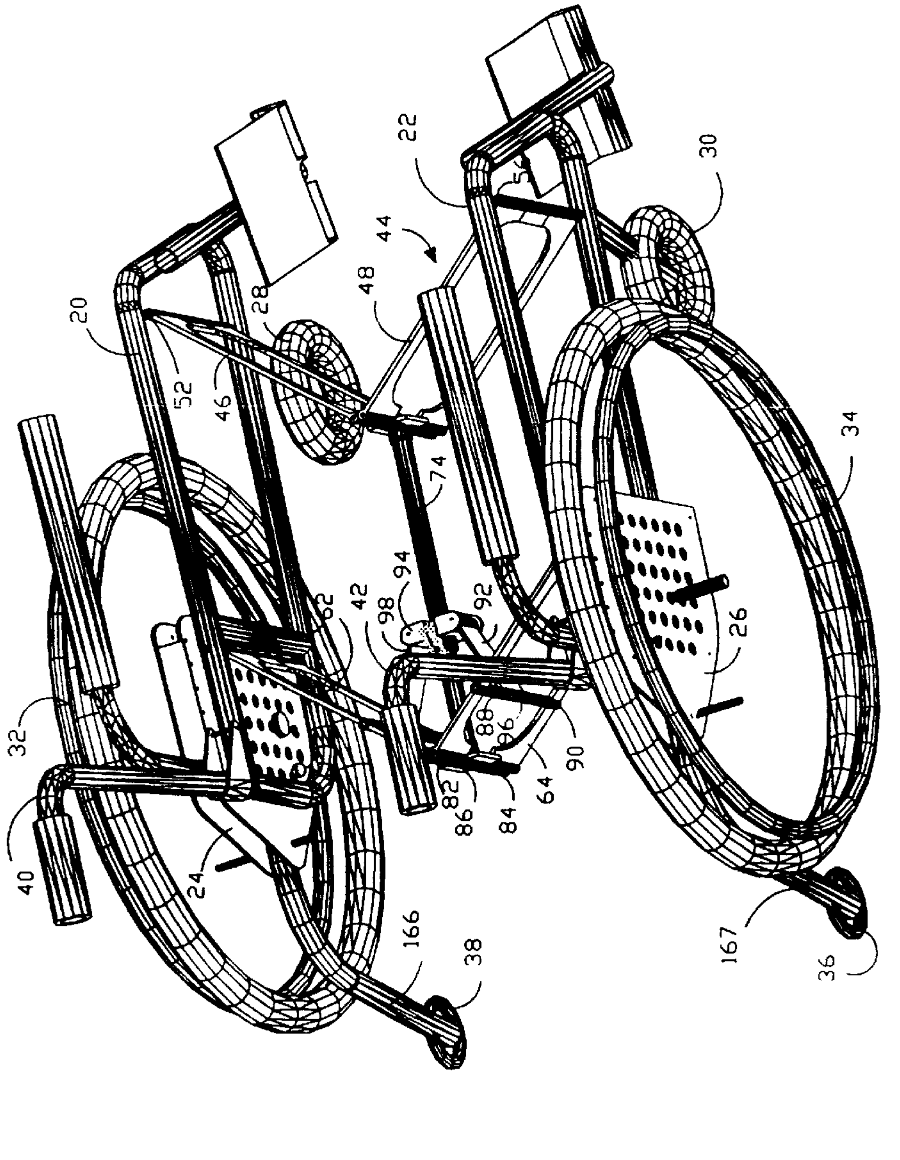
FIG. 4 is an isometric view showing the wheelchair width at an intermediate position.
Figure 5:
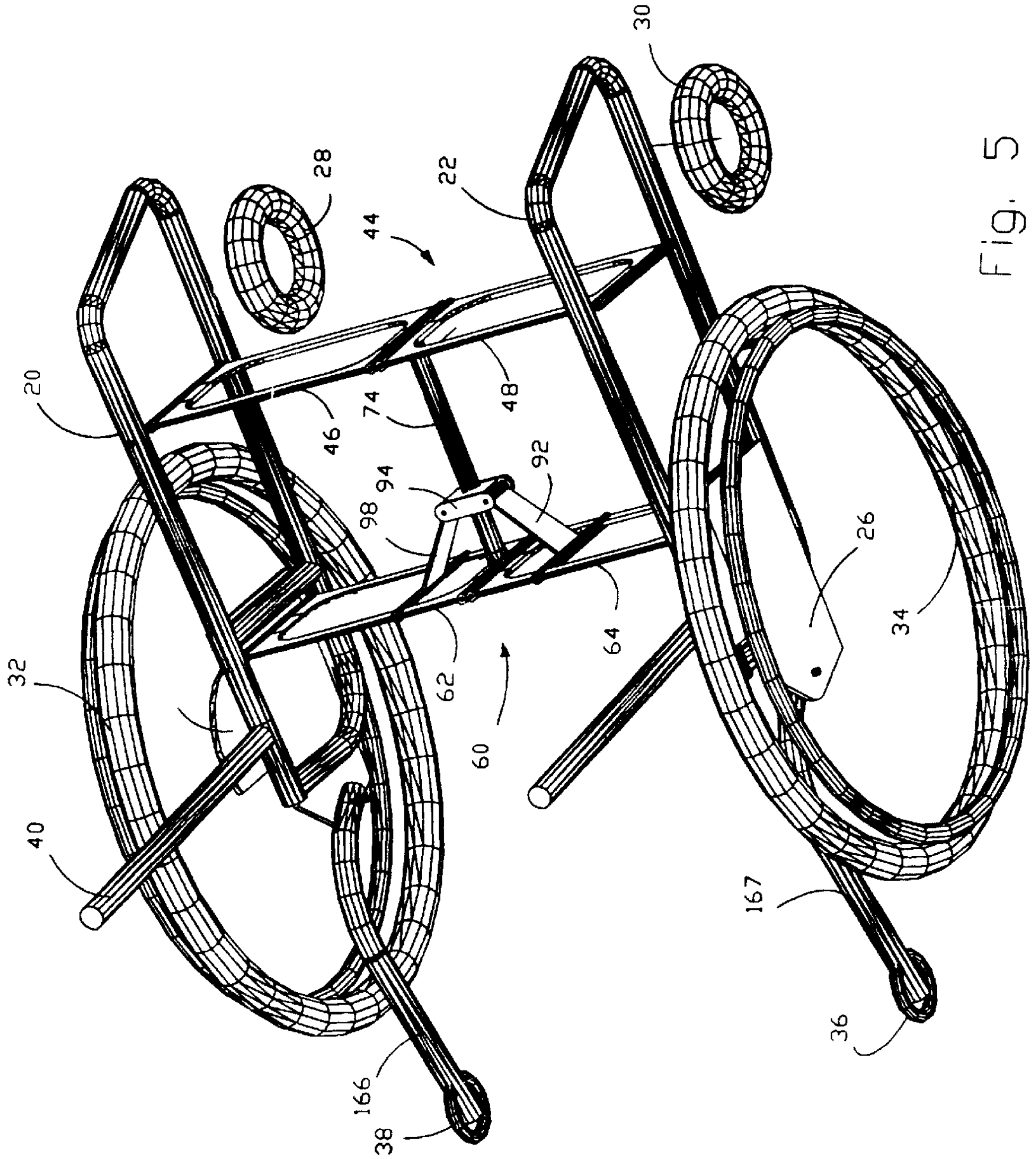
FIG. 5 is an isometric view similar to that of FIG. 4 showing the wheelchair expanded to its maximum width.

A second pair 60 of cross members 62, 64 located toward the rear of side rails 20, 22. and spaced longitudinally from the first pair of cross members 44, are mutually pivotally connected end-to-end at 65. Cross member 62 is pivotally connected at 64, 66 to the upper and lower longitudinal rails of side frame 20; cross member 64 is pivotally connected at 68, 70 to the upper and lower rails of side frame 22. In this way, the cross members of the first pair 44 and second pair 60 can pivot for a variable angular position with respect to the side frames. The lateral space between the side frame, or width of the chair, is determined by the angular position of the cross members and the extent to which they are folded. For example, FIG. 5 shows the front of pair 44 of cross members and the rear pair 60 extending substantially mutually parallel and perpendicular to the side frames so that the wheelchair attains its maximum width. But in FIG. 4, the front pair of cross members 44 and rear pair 60 are partially folded, and the angular position of the cross members is other than substantially perpendicular to the plane of the side rails 20, 22. In the position of FIG. 4, the wheelchair has a reduced width compared to the maximum width of FIG. 5.

The front pair 44 of cross members is pivotally connected to the forward end 72 of an adjustment rail 74, and the rear pair 60 of cross members 62, 64 is pivotally connected to the rearward end 76 of adjustment rail 74. The inner ends of the forward frames 46, 48 that comprise the forward cross member pair 44 are formed with upper and lower devices 76, 78, and the forward end of rail 74 is formed with two devices 80, each of devices being formed with an open-ended through hole that receives a pin to permits hinged rotation of the frames 46, 48 relative to rail 74. Similarly, each of the rear frames 62, 64, which comprise the rear cross member pair 60, is formed with an upper device 82 and a lower device 84. The rearward end of rail 74 is also formed with a device 86 located between the upper and lower devices 82, 84, each of these mutually aligned devices being formed with an open-ended through hole that receives a pin to permit hinged rotation of the frames.

Frame 64 is also formed with an upper device 88, a lower device 90, each formed with a through hole having an open end. An adjustment strut 92 pivotally connected on adjustment block 94 includes a device 96 located between devices 88, 90 and aligned so that a pin can be inserted through the devices 88, 96, 90 to permit strut 92 to rotate relative to frame 64. Similarly, adjustment strut 98 is formed with a device 100 located between an upper clevice 102 and a lower clevice 104, formed on frame 62. A pin is inserted between clevices 102, 100 and 104 to permit strut 98 to rotate relative to frame 62.

Preferably the lengths of cross members 46 and 62 are mutually substantially equal, the lengths of cross members 48 and 64 are mutually substantially equal, and the lengths of struts 92 and 98 are mutually substantially equal. The length of the first side frame 20 between the points where cross members 46 and 62 are coupled to frame 20 is substantially equal to the length of the second side frame 22 between the points where cross members 48 and 64 are coupled to frame 22.

Adjustment block 94 is supported on rail 74 for sliding movement along the axis of the rail. This movement of block 94 changes the angular position of frames 62 and 64 about the side rails 20 and 22, thereby forcing adjustment rail 74 longitudinally relative to block 94 so that the angular position of frames 46 and 48 changes with the change of angular position of frames 62, 64 and the longitudinal position of block 94. In this way, cross member pairs 44, 60 are folded and extended according to the position of block 94 on rail 74 in order to change the width of the wheelchair.

Figure 7:
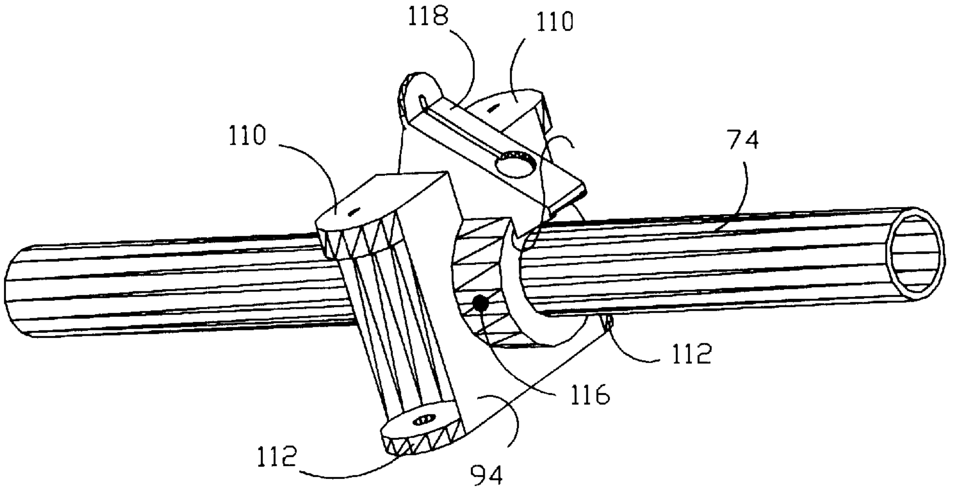
FIG. 7 is an isometric side view showing an alternate form of an adjustment block and latch.

Referring next to FIG. 7, adjustment block 94 is formed with two upper devices 110 and two lower devices 112, a device of each lateral pair, located on opposite lateral sides of the center line of rail 74. A pin, passing through those clevices, hinges each attachment strut 92, 98 on block 94. Rail 74 supports block 94 so that the block can slide longitudinally to a position limited by the located of a collar 114, whose position on rail 74 is fixed by a set screw, bolt or similar attachment 116, which engages rail 74 and fixes the position of collar 114. The upper surface of block 94 pivotally supports a latch 118 having a blocking surface 120. When the latch is in position shown in FIG. 7, surface 120 engages the end face of collar 114, thereby releaseably fastening block 94 to rail 74, but not locking the block to the rail. In order to change the width of the wheelchair, latch 118 can be pivoted at its pinned connection on block 94 out of engagement with collar 114. When this occurs, the latch 118 and block 94 can be moved as a unit away from the position of the collar. The longitudinal position of the collar on rail 74 can be changed by loosening attachment 116, sliding the collar along rail 74, and reattaching the collar to the rail by tightening attachment 116.

Figure 6:
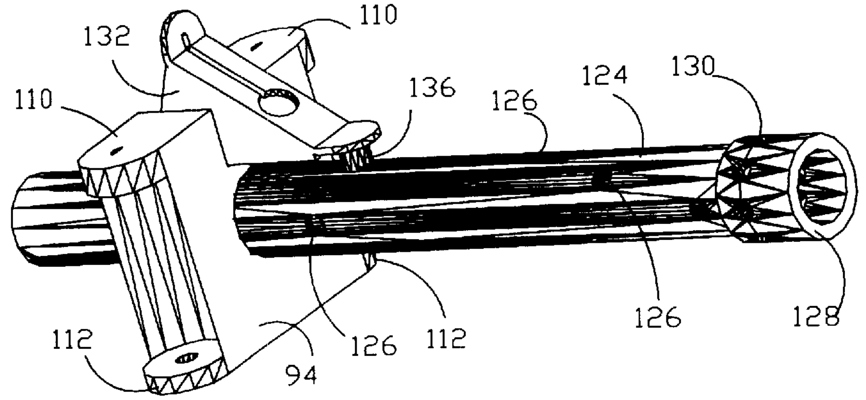
FIG. 6 is an isometric view showing an adjustment block surrounding an adjustment rail and carrying a latch for engaging the rail.
Figure 9:
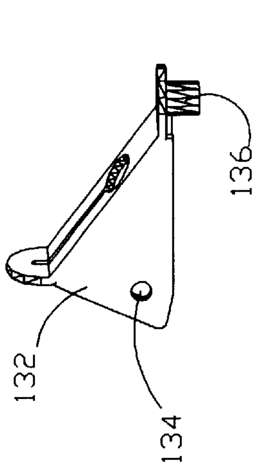
FIG. 9 is a side isometric view showing the latch of FIG. 6.
Figure 8:
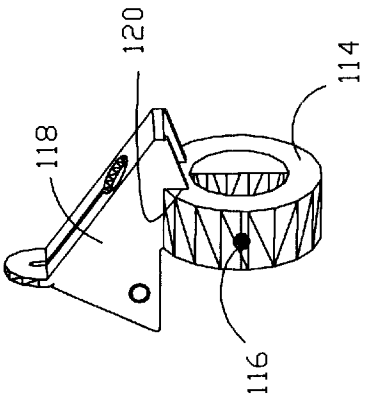
FIG. 8 is an isometric side view showing the collar and latch of FIG. 7.
Figure 10:
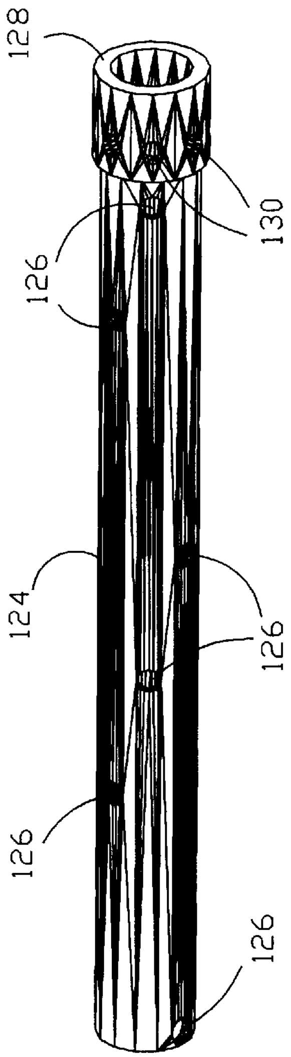
FIG. 10 is an isometric side view showing the adjustment rail of FIG. 6.

Referring now to FIGS. 6, 9 and 10, an alternate adjustment rail 124 is formed with a series of radially directed holes 126, spaced longitudinally along the rail and angularly about the axis of the rail. Alternatively, the holes 126 can form a spiral pattern on the outer surface of rail 124, the spiral extending around the rail and along its length. Collar 128, located at an axial end of rail 124, supports the rail for rotation about its axis and is formed with a series of radially directed hole 130 spaced angularly about the axis. The opposite end of the rail 124 is supported on the front pair 44 of cross members for rotation about its axis. Holes on collar 128 are sized and located to receive a radial pin 131 that passes through holes 130 and through a similar series of holes formed on the end of rail 124. Pin 131 fixes the angular position of rail 124 with respect to the wheelchair and collar 128. Preferably the angular position of the holes 126 is aligned with the angular position of holes 130 so that the latch pin 136 will readily engage holes 126.

A latch 132 is pivotally mounted on block 94 by a pin that passes through a hole 134 on the latch. As the latch is rotated about the axis of hole 134, pin 136, located on the end of latch 132, is brought into engagement with any of holes 126 located on rail 124. When this engagement occurs, block 94 is releasably fastened to rail 124 at a fixed longitudinal position, whereby the width of the wheelchair is held in position. In order to change the width of the wheelchair, latch 132 is rotated to bring pin 136 out of engagement with a hole 126, and block 94 is displaced along rail 124, rail 124 is rotated to bring a different hole into alignment with pin 136, and the latch is pivoted to engage pin 136 and a new hole of rail 124.

Figure 14:
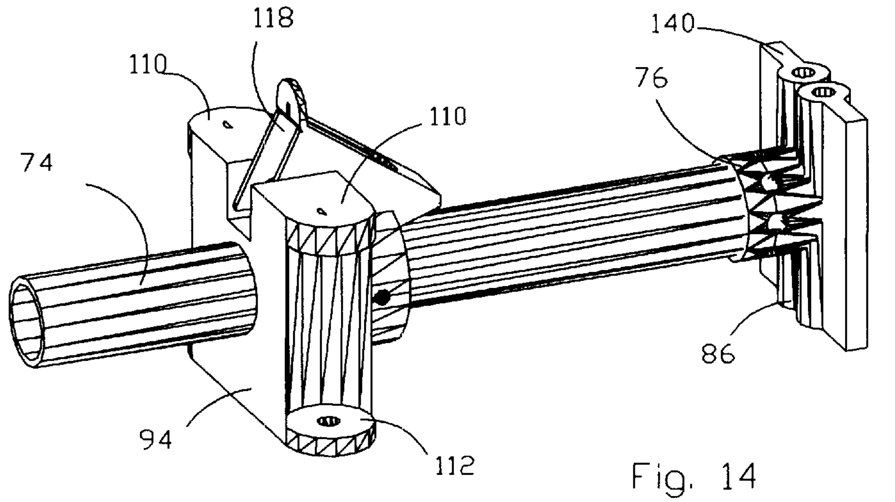
FIG. 14 is an isometric view of the adjustment block, latch and adjustment rail of FIG. 7.

FIG. 14 shows adjustment rail 74 journalled in a collar 76 formed integrally with a plate 140 that includes right-hand and left-hand devices 8, located between the upper clevices 82 and lower devices 84 on frames 62 and 64. The pin that engages the devices 82, 84, 86 permits the frames 62, 64 to rotate relative to plate 140 and rail 74, as FIG. 3 shows.

Figure 11:
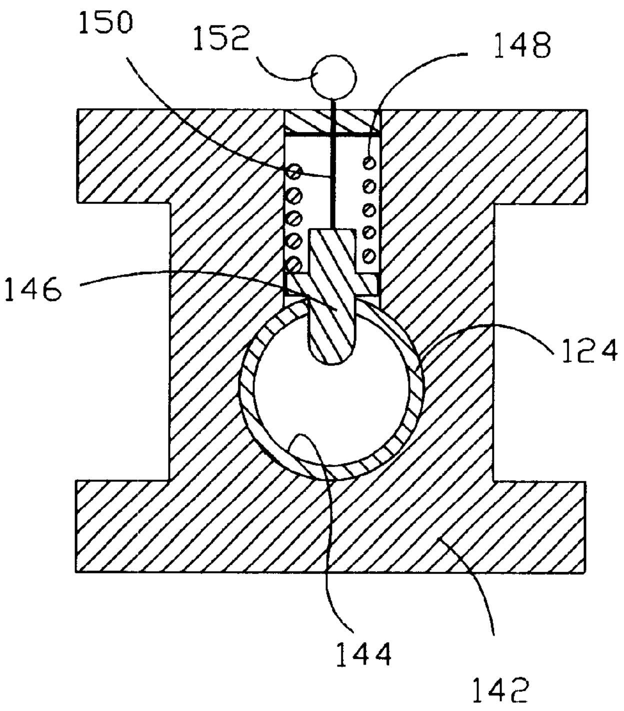
FIG. 11 is a front view of an adjustment block showing a spring-loaded pin for engaging the adjustment rail.

FIG. 11 shows an alternative adjustment block 142 surrounding rail 124. A retractable bolt 146 is urged radially toward rail 124 and into engagement with a hole 126 on the rail by a helical coil spring 148. A cable 150, attached to a handle or grip 152, can be pulled upward against the force of spring 148 to disengage bolt 146 from the hole of rail 124, thereby permitting the load block 142 to be moved longitudinally.

Figure 12:
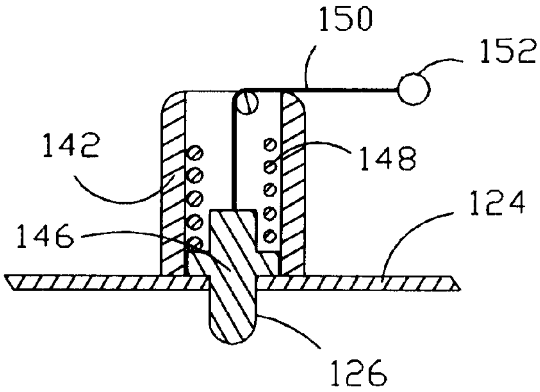
FIG. 12 is a side view of a retractable spring-loaded pin of FIG. 11.
Figure 13:
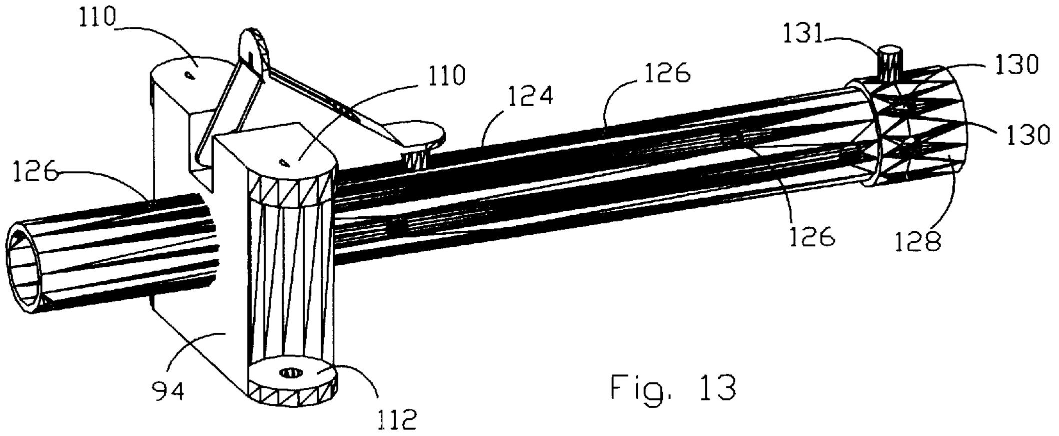
FIG. 13 is an isometric view of the adjustment block, latch and adjustment rail of FIG. 6.

FIG. 12 shows a side view of block 142, spring 148, cable 150, bolt 146, and handle 152, which can be gripped manually and pulled against the force of spring 148 to disengage bolt 146 from hole 126 on rail 124.

Preferably each adjustment rail is marked on its outer surface at points spaced along its length with a scale comprising a scribed line and a number or legend that indicates the actual width or relative width of the wheelbase that corresponds to placing the adjustment block at the position of the line, number or legend.

Figure 15:
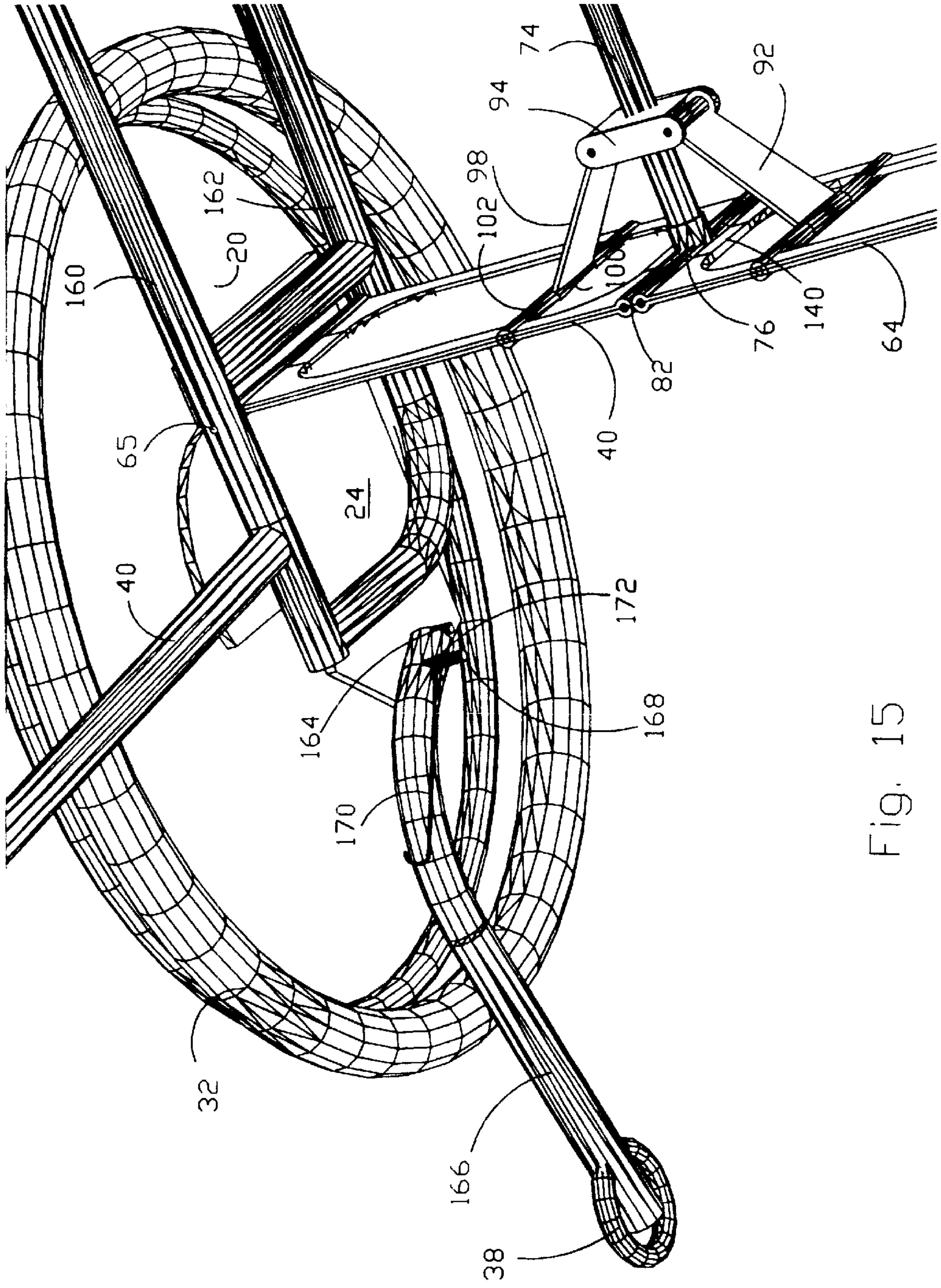
FIG. 15 is an isometric side view showing a tilt wheel pivotally supported on a frame.

FIG. 15 shows frame 62 pivotally supported for rotation about a pin 65, which passes through the upper longitudinal rail 160 and lower rail 162 of the side frame 20. Mounting plate 24 supports the left-hand side main wheel 32 and carries a stopper surface 164, engaged by the end of an anti-tipping bar 166, which is pivotally supported on mounting plate 24 by a laterally directed pin 168 that passes through bar 166 and plate 24. A spring 170 urges the anti-tipping bar 166 to rotate about pin 168 toward contact with the ground. As the chair rotates, e.g. when the occupant attempts to clear an obstruction, such as that shown in FIG. 1, the load applied by spring 170 to bar 166 operates to stabilize the chair and to prevent its overturning. The arrangement of FIG. 15 is typical of both sides of the chair; therefore, two spring loaded anti-tipping bars bias two tilt wheels toward ground contact to apply a restoring force to the chair tending to prevent tip-over.

When the wheelchair assumes the position of FIG. 1, tilt wheel 38 is maintained in contact with the ground due to the force of spring 170, but the chair rotates counterclockwise when viewed from the right-hand side, against the resilient force of spring 170 until the end 172 of bar 166 contacts stopper 164. Contact between bar 166 and the stopper surface limits the extent to which the chair can rotate. Thereafter, further backward tilting of the chair is prevented due to contact of the tilt wheels with ground, and contact of bar 166 with stopper 164.

Anti-tipping bars 166, 167 can be biased toward ground contact by coupling a pneumatic or hydraulic cylinder and a piston moving within the cylinder between bars 166, 167 and side frames 20, 22. The piston will be biased in response to movement of the rails relative to the frames by compressed fluid in the cylinder toward ground contact. EPO Patent 0 45 171 B1 describes a piston and cylinder applied to a wheelchair assembly for a different purpose than this.

Figure 16:
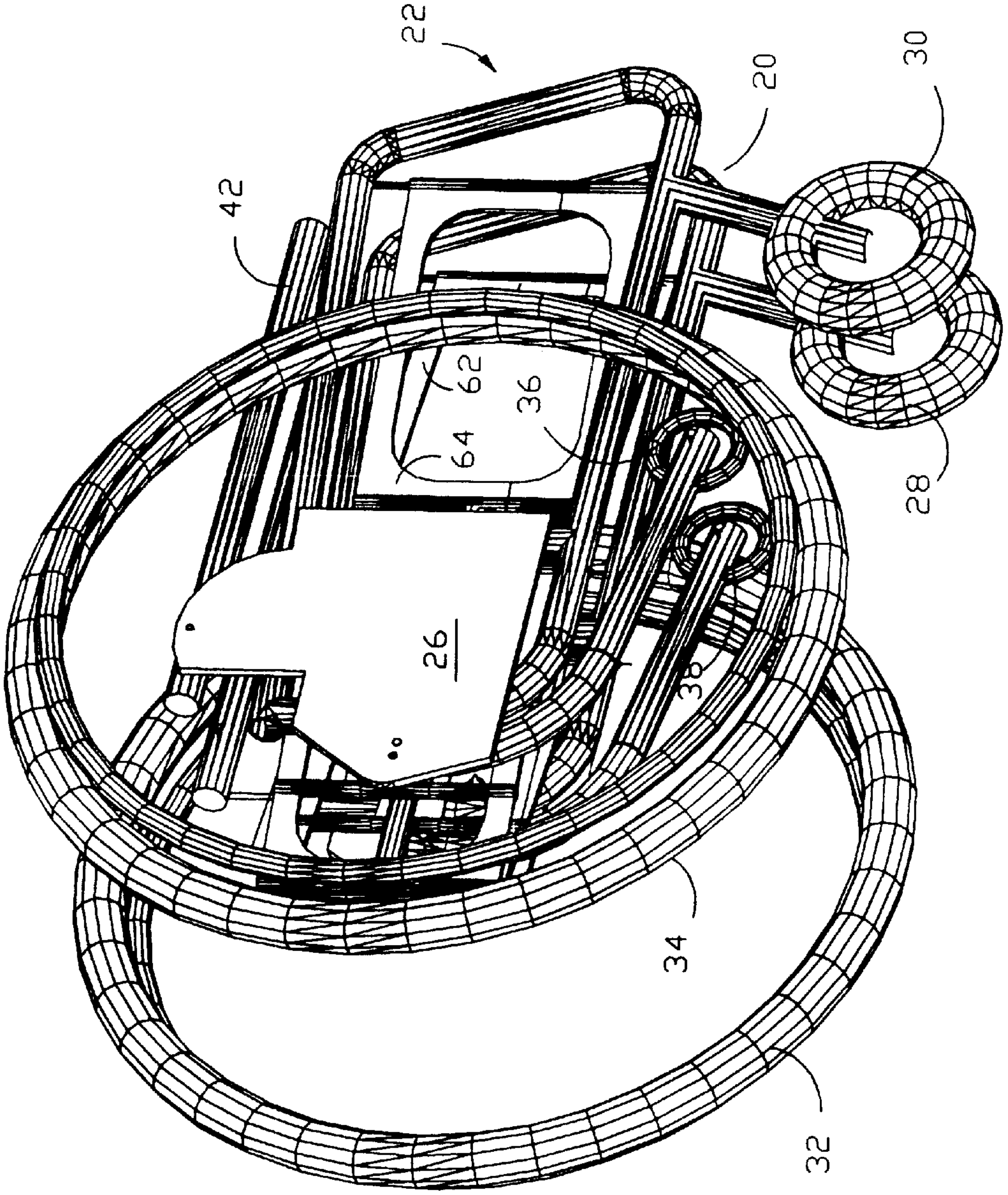
FIG. 16 is an isometric view of the wheelchair showing the tilt wheel retracted and the wheelchair folded to its minimum width.

FIG. 16 shows the wheelchair folded to its minimum width, rails 40, 42 folded forward, and tilt wheels 36, 38 and bars 166 folded forward due to the force of spring 170.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. An apparatus for use as a wheelchair frame, comprising:

a first side frame;

a second side frame substantially parallel to the first side frame and spaced laterally therefrom;

a first pair of cross members, mutually pivotally interconnected at an inner end thereof and foldable about the pivotal interconnection, a first member of the first pair coupled to and pivotably supported on the first side frame for variable angular positions, a second member of the first pair being coupled to and pivotably supported on the second side frame for variable angular position;

a second pair of cross members spaced longitudinally from said first pair of cross members, mutually pivotally interconnected at an inner end thereof and foldable about the pivotal interconnection, a first member of the second pair coupled to and pivotally supported on the first side frame for variable angular position, a second member of the second pair pivotally being coupled to the second side frame for variable angular position; and means for adjusting and releasably holding the first pair of cross members and second pair of cross members at predetermined angular positions relative to the first and second side frames, including a longitudinally extending rail, supported for rotation about a longitudinal axis, a first end of the rail pivotably coupled to the first pair of cross members at a location spaced from the first and second side frames, a second end of the rail pivotably coupled to the second pair of cross members at a location spaced from the first and second side frames; and struts supported on the rail for movement along the rail, pivotably coupled to the rail, and extending from the rail toward and pivotably coupled to one member of the group consisting of the members of the first pair of cross members and the members of the second pair of cross members.

2. The apparatus of claim 1, further comprising:

a first caster wheel coupled near a forward portion of the first side frame;

a second caster wheel coupled near a forward portion of the second side frame;

a first primary wheel coupled near a rearward portion of the first side frame;

a second primary wheel coupled near a rearward portion of the second side frame.

3. The apparatus of claim 1, further comprising:

a longitudinally extending rail, supported for rotation about a longitudinal axis, a first end of the rail pivotably coupled to the first pair of cross members at a location spaced from the first and second side frames, a second end of the rail pivotably coupled to the second pair of cross members at a location spaced from the first and second side frames;

a collar releasably fixed to the rail at various positions along the rail;

a block supported on the rail for movement among spaced positions along the rail;

struts supported on the block for movement along the rail, pivotably coupled to the block, and extending from the block toward and pivotably coupled to one member of the group consisting of the members of the first pair of cross members and the members of the second pair of cross members; and a latch carried on the block, alternately engaged with and disengaged from the collar, whereby said angular positions of the members of the first and second cross members are releasably held relative to the first and second side frames.

4. The apparatus of claim 1, further comprising:

a longitudinally extending rail having spaced holes on its surface, a first end of the rail pivotably coupled to the first pair of cross members at a location spaced from the first and second side frames, a second end of the rail pivotably coupled to the second pair of cross members at a location spaced from the first and second side frames;

a block supported on the rail for movement among spaced positions along the rail;

struts supported on the block for movement along the rail, pivotably coupled to the block, and extending from the block toward and pivotably coupled to one member of the group consisting of the members of the first pair of cross members and the members of the second pair of cross members; and a latch carried on the block, alternately engaged with and disengaged from a selected hole on the rail, whereby said angular positions of the first and second cross members are releasably held relative to the first and second side frames.

5. The apparatus of claim 4, wherein the spaced holes on the longitudinally extending rail form a spiral pattern extending along the rail and around an outer surface of the rail.

6. The apparatus of claim 4, wherein said rail further comprises a scale of marks located on an outer surface of the rail at locations spaced along the rail, the marks indicating a lateral distance between the first and second side frames.

7. The apparatus of claim 1, further comprising:

a longitudinally extending rail, supported for rotation about a longitudinal axis, having spaced holes on its surface, a first end of the rail pivotably coupled to the first pair of cross members at a location spaced from the first and second side frames, a second end of the rail pivotably coupled to the second pair of cross members at a location spaced from the first and second side frames;

a block supported on the rail for movement along the rail;

struts supported on the block for movement along the rail, pivotably coupled to the block, and extending from the block toward and pivotably coupled to one member of the group consisting of the members of the first pair of cross members and the members of the second pair of cross members;

a pin carried on the block;

a spring carried on the block, urging the pin into engagement with a selected hole on the rail; and a cable connected to the pin, for disengaging the pin from a selected hole on the rail, whereby said angular positions of the members of the first and second cross members are releasably held relative to the first and second side frames.

8. The apparatus of claim 1, wherein:

the first cross members have lengths that are mutually substantially equal;

the second cross members have lengths that are mutually substantially equal;

the struts have lengths that are mutually substantially equal; and the first side frame and second side frame have lengths, extending between locations where said cross members are coupled thereto, that are mutually substantially equal.

9. The apparatus of claim 1, further comprising a latch coupled to the struts, moveable along the rail, alternately engaged with and disengaged from the rail, whereby said angular positions of the members of the first cross member and second cross member are releasably held relative to the first and second side frames.

10. An apparatus for use as a wheelchair frame, comprising;

a first side frame;

a second side frame substantially parallel to the first side frame and spaced laterally therefrom;

a first pair of cross members, mutually pivotally interconnected at an inner end thereof and foldable about the pivotal interconnection, a first member of the first pair coupled to and pivotably supported on the first side frame for variable angular positions, a second member of the first pair being coupled to and pivotably supported on the second side frame for variable angular position;

a second pair of cross members spaced longitudinally from said first pair of cross members, mutually pivotally interconnected at an inner end thereof and foldable about the pivotal interconnection, a first member of the second pair coupled to and pivotally supported on the first side frame for variable angular position, a second member of the second pair pivotably being coupled to the second side frame for variable angular position;

means for adjusting and releasably holding the first pair of cross members and second pair of cross members at predetermined angular positions relative to the first and second side frames;

a first tilt wheel extending outward from, and pivotably supported on the first side frame, continually biased resiliently downward toward ground contact and opposing displacement upward away from ground contact; and a second tilt wheel extending outward from, and pivotably supported on the second side frame, continually biased resiliently downward toward ground contact and opposing displacement upward away from ground contact, including a longitudinally extending rail, supported for rotation about a longitudinal axis, a first end of the rail pivotably coupled to the first pair of cross members at a location spaced from the first and second side frames, a second end of the rail pivotably coupled to the second pair of cross members at a location spaced from the first and second side frames; and struts supported on the rail for movement along the rail, pivotably coupled to the rail, and extending from the rail toward and pivotably coupled to one member of the group consisting of the members of the first pair of cross members and the members of the second pair of cross members.

11. The apparatus of claim 10, further comprising:

a first stop surface fixed to a side frame for limiting angular displacement of the first tilt wheel with respect to the first side frame; and a second stop surface fixed to a side frame for limiting angular displacement of the second tilt wheel with respect to the second side frame.

12. The apparatus of claim 10, further comprising:

a first caster wheel coupled near a forward portion of the first side frame;

a second caster wheel coupled near a forward portion of the second side frame;

a first primary wheel coupled near a rearward portion of the first side frame; and a second primary wheel coupled near a rearward portion of the second side frame.

13. The apparatus of claim 10, further comprising:

a longitudinally extending rail, supported for rotation about a longitudinal axis, a first end of the rail pivotably coupled to the first pair of cross members at a location spaced from the first and second side frames, a second end of the rail pivotably coupled to the second pair of cross members at a location spaced from the first and second side frames;

a collar releasably fixed to the rail at various positions along the rail;

a block supported on the rail for movement among spaced positions along the rail;

struts supported on the block for movement along the rail, pivotably coupled to the block, and extending from the block toward and pivotably coupled to one member of the group consisting of the members of the first pair of cross members and the members of the second pair of cross members; and a latch carried on the block, alternately engaged with and disengaged from the collar, whereby said angular positions of the members of the first and second cross members are releasably held relative to the first and second side frames.

14. The apparatus of claim 10, further comprising:

a longitudinally extending rail having spaced holes on its surface, a first end of the rail pivotably coupled to the first pair of cross members at a location spaced-from the first and second side frames, a second end of the rail pivotably coupled to the second pair of cross members at a location spaced from the first and second side frames;

a block supported on the rail for movement among spaced positions along the rail;

struts supported on the block for movement along the rail, pivotably coupled to the block, and extending from the block toward and pivotably coupled to one member of the group consisting of the members of the first pair of cross members and the members of the second pair of cross members; and a latch carried on the block, alternately engaged with and disengaged from a selected hole on the rail, whereby said angular positions of the first and second cross members are releasably held relative to the first and second side frames.

15. The apparatus of claim 14, wherein the spaced holes on the longitudinally extending rail form a spiral pattern extending along the rail and around an outer surface of the rail.

16. The apparatus of claim 14, wherein said rail further comprises a scale of marks located on an outer surface of the rail at locations spaced along the rail, the marks indicating a lateral distance between the first and second side frames.

17. The apparatus of claim 10, further comprising:

a longitudinally extending rail, supported for rotation about a longitudinal axis, having spaced holes on its surface, a first end of the rail pivotably coupled to the first pair of cross members at a location spaced from the first and second side frames, a second end of the rail pivotably coupled to the second pair of cross members at a location spaced from the first and second side frames;

a block supported on the rail for movement along the rail;

struts supported on the block for movement along the rail, pivotably coupled to the block, and extending from the block toward and pivotably coupled to one member of the group consisting of the members of the first pair of cross members and the members of the second pair of cross members;

a pin carried on the block;

a spring carried on the block, urging the pin into engagement with a selected hole on the rail; and a cable connected to the pin, for disengaging the pin from a selected hole on the rail, whereby said angular positions of the members of the first and second cross members are releasably held relative to the first and second side frames.

18. The apparatus of claim 10, wherein:

the first cross members have lengths that are mutually substantially equal;

the second cross members have lengths that are mutually substantially equal;

the struts have lengths that are mutually substantially equal; and the first side frame and second side frame have lengths, extending between locations where said cross members are coupled thereto, that are mutually substantially equal.

19. The apparatus of claim 10, further comprising a latch coupled to the struts, moveable along the rail, alternately engaged with and disengaged from the rail, whereby said angular positions of the members of the first cross member and second cross member are releasably held relative to the first and second side frames.

* * * * *